United States Patent
Zhong et al.

(10) Patent No.: US 11,477,301 B1
(45) Date of Patent: Oct. 18, 2022

(54) DYNAMIC MEASUREMENT ANALYSIS AND OPTIMIZATION OF MICRO-SERVICE ARCHITECTURE FOR EDGE COMPUTING

(71) Applicant: Dell Products L.P., Round Rock, TX (US)

(72) Inventors: Haijun Zhong, Shanghai (CN); XiaoJun Wu, Shanghai (CN); Muzhar S. Khokhar, Shrewsbury, MA (US); Yuyan Chen, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/586,413

(22) Filed: Jan. 27, 2022

(51) Int. Cl.
*H04L 67/51* (2022.01)
*H04L 43/04* (2022.01)
*H04L 67/1097* (2022.01)
*G06F 9/54* (2006.01)

(52) U.S. Cl.
CPC .............. *H04L 67/51* (2022.05); *G06F 9/547* (2013.01); *H04L 43/04* (2013.01); *H04L 67/1097* (2013.01)

(58) Field of Classification Search
CPC ..... H04L 67/51; H04L 67/1097; H04L 43/04; G06F 9/547
USPC ........................................................ 709/224
See application file for complete search history.

(56) References Cited

U.S. PATENT DOCUMENTS

| | | | |
|---|---|---|---|
| 2007/0011668 A1* | 1/2007 | Wholey ................ | G06F 8/34 717/113 |
| 2007/0074186 A1* | 3/2007 | Muthukumar .......... | G06F 8/443 717/140 |
| 2019/0386883 A1* | 12/2019 | Bhat ....................... | H04L 41/14 |
| 2021/0218787 A1* | 7/2021 | Sodagar .............. | H04L 67/1044 |

OTHER PUBLICATIONS

"Microservices", wikipedia.com, 13 pages (Year: 2022).*
"What is Microservices Architecture?", cloud.google.com, 5 pages (Year: 2022).*
Posta, "Netflix OSS, Spring Cloud, or Kubernetes? How About All of Them!", blog.christianposta.com, 14 pages (Year: 2016).*

* cited by examiner

*Primary Examiner* — Wing F Chan
*Assistant Examiner* — Leon Y Tseng
(74) *Attorney, Agent, or Firm* — Jackson Walker L.L.P.

(57) ABSTRACT

A method for managing a cloud computing platform including an edge-side and a cloud-side sends a data collection service from the cloud side to the edge side environment to collect edge data indicative of one or more microservice architecture (MSA) parameters associated with one or more microservices in the edge side. An measurement of the edge data is performed to identify dependencies between one or more MSA parameters and one or more edge environment settings. Based at least in part on the MSA measurement, one or more edge environment optimizations are identified and one or more appropriate fixes are implemented within a cloud-side modified edge environment. Before distributing the modified edge environment to the edge, an in-cloud verification of the cloud-side modified edge environment.

15 Claims, 4 Drawing Sheets

$$\vec{v} = v_1 \vec{x}_1 + v_2 \vec{x}_2 + v_3 \vec{x}_3 = \sum_i v_i \vec{x}_i = \begin{bmatrix} v_1 \\ v_2 \\ v_3 \end{bmatrix}$$

FIG. 2

$$\sigma_{ij} = \begin{bmatrix} \sigma_{11} & \sigma_{12} & \sigma_{13} \\ \sigma_{21} & \sigma_{22} & \sigma_{23} \\ \sigma_{31} & \sigma_{32} & \sigma_{33} \end{bmatrix}$$

FIG. 3

DYNAMIC MEASUREMENT ANALYSIS AND OPTIMIZATION OF MICRO-SERVICE ARCHITECTURE FOR EDGE COMPUTING

TECHNICAL FIELD

The present disclosure relates to cloud computing platforms and, more specifically, managing edge computing environments.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In accordance with teachings disclosed herein, a method for managing a cloud computing platform including an edge-side and a cloud-side sends a data collection service from the cloud side to the edge side environment to collect edge data indicative of one or more microservice architecture (MSA) parameters associated with one or more microservices in the edge side. An measurement, referred to herein as an MSA measurement, of the edge data is performed to identify dependencies between one or more MSA parameters and one or more edge environment settings. Based at least in part on the MSA measurement, one or more edge environment optimizations are identified and one or more appropriate fixes are implemented within a cloud-side modified edge environment. Before distributing the modified edge environment to the edge, an in-cloud verification of the cloud-side modified edge environment.

The edge data may include data for one or more MSA parameters. MSA parameters may include, without limitation, API call data, for one or more API calls made in the edge-side, identifying an API, a start time, an end time, and a response, micro-service CPU data identifying a micro-service, CPU usage data for the microservice, and a timestamp, micro-service memory data identifying a microservice, memory usage data for the microservice, and a timestamp, and uncategorized network bandwidth data indicating an edge side bandwidth and a timestamp.

In at least some instances the data collection service may be re-sent from the cloud to the edge side to collect more detailed data for one or more parameters. As a non-limiting example, the data collection service may be re-sent to obtain microservice-specific bandwidth data identifying a microservice, a bandwidth associated with the microservice and a timestamp to supplement the uncategorized bandwidth data. Disclosed methods and systems may further include or perform in cloud analysis of edge data to determine, as an example, a covariance matrix for one or more of the MSA parameters included in the edge data. cloud analysis may develop statistics for other parameters not expressly disclosed herein.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates an exemplary data format for at least some instances of collected edge data;

FIG. 3 illustrates a form of a covariance matrix statistic determined by disclosed methods and systems;

DETAILED DESCRIPTION

Figure 1:
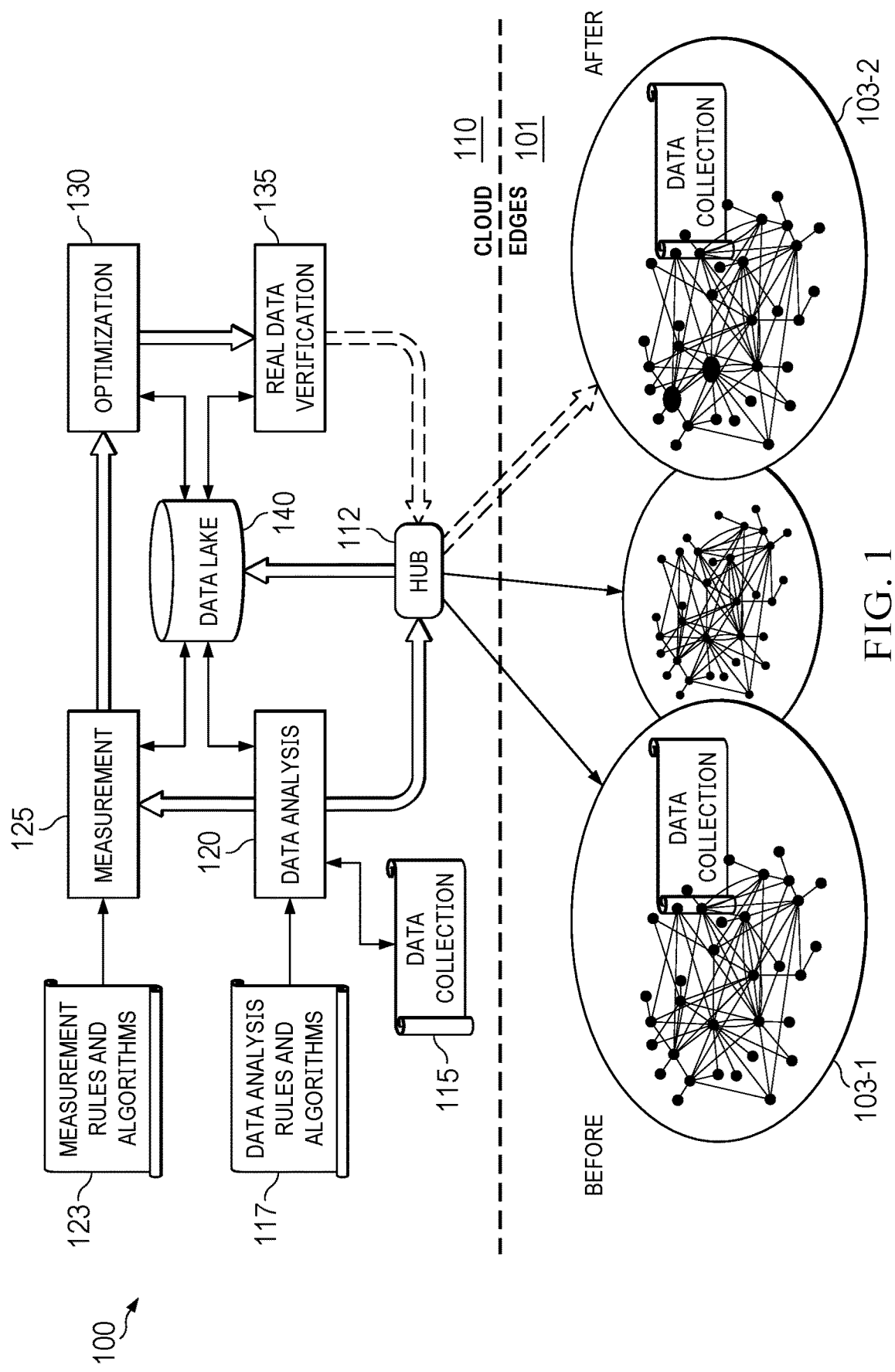
FIG. 1 is a graphical representation of a microservice architecture analysis solution in accordance with disclosed teachings.

Exemplary embodiments and their advantages are best understood by reference to FIGS. 1-5, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Figure 4:
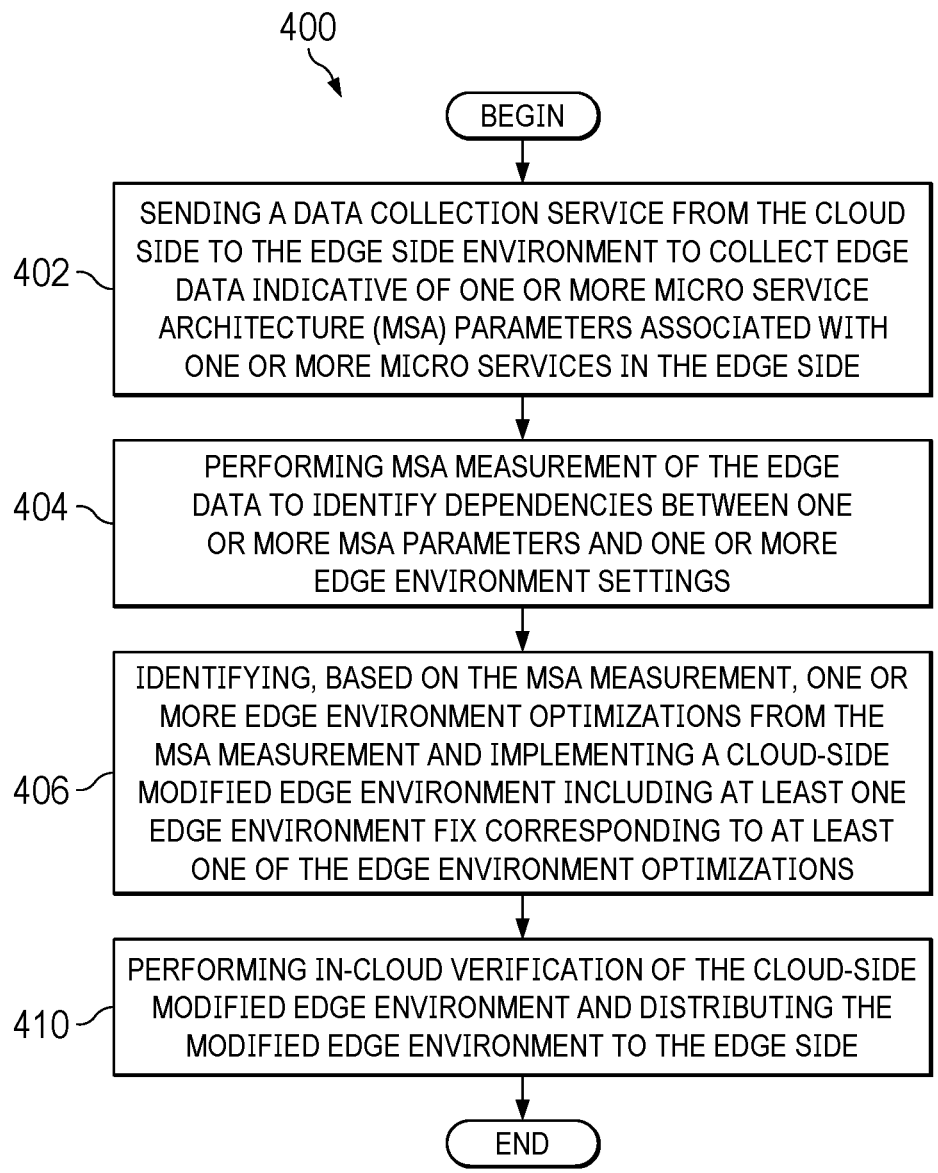
FIG. 4 illustrates a flow diagram of a microservice architecture management method in accordance with disclosed teachings.
Figure 5:
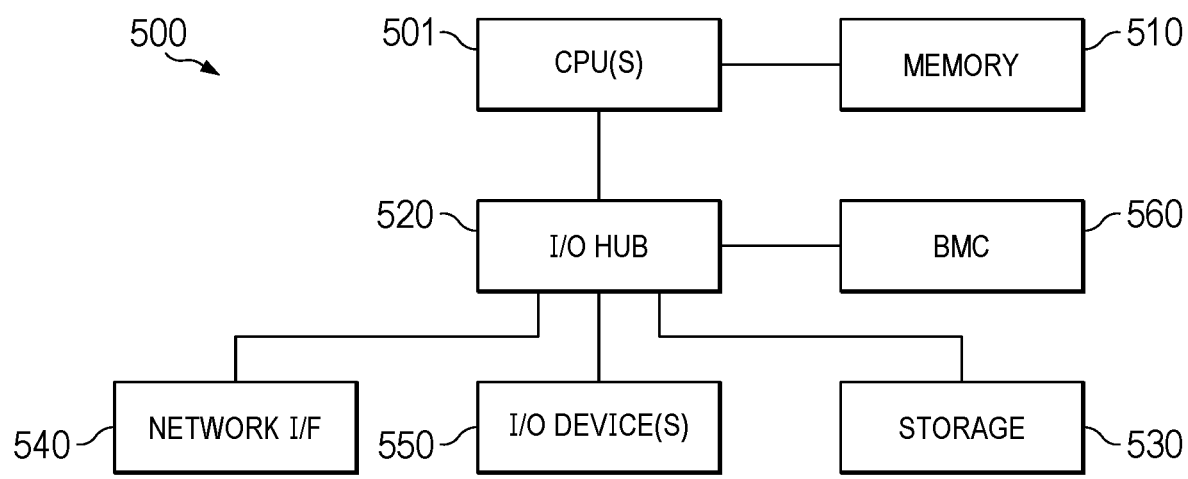
FIG. 5 illustrates an exemplary information handling system suitable for use in perform or implementing elements depicted in FIG. 1 through FIG. 4.

Referring now to the drawings, FIG. 1, which illustrates an exemplary microservice architecture (MSA) analysis and optimization solution 100, referred to hereafter simply as solution 100, is described in conjunction with an MSA analysis and optimization method 400 illustrated in the flow diagram of FIG. 4.

The solution 100 illustrated in FIG. 1 one comprises a cloud computing platform including an edge network portion, informally referred to herein as edge side 101, and a cloud resource portion informally referred to herein as cloud side 110. In at least one embodiment, the resources illustrated in cloud side 110 of solution 100 are configured to perform a MSA analysis and optimization method including elements of the method 400 depicted in FIG. 4.

The cloud side resources of the illustrated solution 100 include a data collection service 115 which, in accordance with method 400, may send (block 402) through a hub 112 of solution 100, a data collection service from cloud side 110 to edge side 101 to collect edge data and stored the edge data in a data lake 140 of solution 100. In at least some embodiments, the edge data collected by data collection service 115 is indicative of one or more MSA parameters associated with one or more microservices (not explicitly depicted in FIG. 1) executing within edge side 101.

In some embodiments, data collection service 115 may be configured to collect data including but not limited to time stamped API data including an identifier of an API or an API call, a start time, an end time, and a response. Data collection service 115 may also be configured to collect microservice specific performance data including microservice specific CPU data indicating a microservice, CPU usage, and a timestamp, as well as microservice memory data identifying a microservice and including a corresponding memory usage value, and a timestamp. Data collected by microservices 115 may be sent up to cloud side 110 for analysis. In some instances, solution 100 may resend data collection service 115 when solution 100 determines that additional data is required or desired for the applicable analysis. For example, solution 100 may resend data collection service 115 to edge side 101 to collect microservice-specific bandwidth data that identifies the applicable microservice, and includes bandwidth information, and a timestamp. In at least lease some deployments, data collection service 115 may format collected data as vector data, such as the vector 200 illustrated in FIG. 2, and may impose or support a single width format to conserve storage and available bandwidth.

Solution 100 as illustrated in FIG. 1 further includes a data analysis module 120 and associated data analysis rules and algorithms 117, which may be configured to apply clustering algorithms and or classification algorithms to edge collected data and analyze the data with respect to specific edge environment settings and versions to detect dependencies between MSA performance and edge environment configuration. Data analysis module 120, for example, determine a covariance matrix such as the matrix 300 illustrated in FIG. 3.

The solution 100 illustrated in FIG. 1 further includes microservice architecture measuring module 125, and associated measurement rules and algorithms 123, configured, in at least some implementations, to perform the method step 404 illustrated in FIG. 4 to perform MSA measurement of the edge data and identify dependencies between one or more MSA parameters in one or more edge environment settings. MSA measurement module 125 may, for example, determine dependencies and relationships among API calls microservice performance band with data and settings or versions of the edge environment. classification algorithms may be executed to further clarify the impact of edge environment parameters on the microservice architecture performance. Measurement of the microservice architecture may, in at least in part, be based on existing architectural design patterns including, without limitation, API gateway, circuit, breaker, aggregator, Shane, Branch, asynchronous MSG, and data migration patterns each of which will be familiar to those of ordinary skill in the field of microservice architecture and edge computing platforms.

The solution 100 illustrated in FIG. 1 further includes optimization module 130 configured to perform the method step 406 illustrated in FIG. 4 for identifying, based on the MSA measurements taken in operation 404, one or more edge environment optimizations. Operation 406 may further include implementing a cloud side modified edge environment that includes one or more edge environment fixes corresponding to at least one of the edge environment optimizations. Before releasing the modified edge environment to the cloud side, the method 400 of FIG. 4 may further include performing (operation 406) in-cloud verification, by a real data verification module 135, of the modified edge environment. After verifying the modified edge environment, the modified edge environment may be then distributed to the edge side. FIG. 1 depicts before and after representation 103-1 and 103-2 of edge side 101 to convey modifications to the edge side made in accordance with methods disclosed herein.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for managing a cloud computing platform including an edge-side and a cloud-side, wherein the method comprises:
   sending a data collection service from the cloud side to the edge side environment to collect edge data indicative of one or more microservice architecture (MSA) parameters associated with one or more microservices in the edge side;
   performing MSA measurement of the edge data to identify dependencies between one or more MSA parameters and one or more edge environment settings;
   identifying, based on the MSA measurement, one or more edge environment optimizations from the MSA measurement and implementing a cloud-side modified edge environment including at least one edge environment fix corresponding to at least one of the edge environment optimizations;
   performing in-cloud verification of the cloud-side modified edge environment; and
   distributing the modified edge environment to the edge side.

2. The method of claim 1, wherein the edge data includes data for one or more MSA parameters selected from:
   application programming interface (API) call data, for one or more API calls made in the edge-side, identifying an API, a start time, an end time, and a response;
   micro-service central processing unit (CPU) data identifying a micro-service, CPU usage data for the micro-service, and a timestamp; and
   micro-service memory data identifying a microservice, memory usage data for the microservice, and a timestamp; and
   network bandwidth data indicating an edge side bandwidth and a timestamp.

3. The method of claim 2, further comprising re-sending the data collection service to collect more detailed data, wherein the more detailed data includes microservice bandwidth data identifying a microservice, a bandwidth associated with the microservice and a timestamp.

4. The method of claim 1, further comprising:
   performing in cloud analysis to determine a variance co-matrix for one or more of the MSA parameters included in the edge data.

5. The method of claim 1, wherein performing the MSA measurement includes:
   applying at least one of a clustering algorithm and a classification algorithm to the edge data and, in view of edge settings, determining dependencies between API calls, performance, and bandwidth one or more edge environment settings and versions.

6. An information handling system, comprising:
   a central processing unit (CPU); and
   a computer readable memory, accessible to the CPU, including processor executable instruction method for managing a cloud computing platform including an edge-side and a cloud-side, wherein the method comprises:
   sending a data collection service from the cloud side to the edge side environment to collect edge data indicative of one or more microservice architecture (MSA) parameters associated with one or more microservices in the edge side;
   performing MSA measurement of the edge data to identify dependencies between one or more MSA parameters and one or more edge environment settings;
   identifying, based on the MSA measurement, one or more edge environment optimizations from the MSA measurement and implementing a cloud-side modified edge environment including at least one edge environment fix corresponding to at least one of the edge environment optimizations;
   performing in-cloud verification of the cloud-side modified edge environment; and
   distributing the modified edge environment to the edge side.

7. The information handling system of claim 6, wherein the edge data includes data for one or more MSA parameters selected from:
   application programming interface (API) call data, for one or more API calls made in the edge-side, identifying an API, a start time, an end time, and a response;

micro-service CPU data identifying a micro-service, CPU usage data for the microservice, and a timestamp; and micro-service memory data identifying a microservice, memory usage data for the microservice, and a timestamp; and network bandwidth data indicating an edge side bandwidth and a timestamp.

8. The information handling system of claim 7, further comprising re-sending the data collection service to collect more detailed data, wherein the more detailed data includes microservice bandwidth data identifying a microservice, a bandwidth associated with the microservice and a timestamp.

9. The information handling system of claim 6, further comprising:

performing in cloud analysis to determine a variance co-matrix for one or more of the MSA parameters included in the edge data.

10. The information handling system of claim 6, wherein performing the MSA measurement includes:

applying at least one of a clustering algorithm and a classification algorithm to the edge data and, in view of edge settings, determining dependencies between API calls, performance, and bandwidth one or more edge environment settings and versions.

11. A non-transitory computer readable medium, comprising:

a central processing unit (CPU); and a computer readable memory, accessible to the CPU, including processor executable instruction method for managing a cloud computing platform including an edge-side and a cloud-side, wherein the method comprises:

sending a data collection service from the cloud side to the edge side environment to collect edge data indicative of one or more microservice architecture (MSA) parameters associated with one or more microservices in the edge side;

performing microservice architecture (MSA) measurement of the edge data to identify dependencies between one or more MSA parameters and one or more edge environment settings;

identifying, based on the MSA measurement, one or more edge environment optimizations from the MSA measurement and implementing a cloud-side modified edge environment including at least one edge environment fix corresponding to at least one of the edge environment optimizations;

performing in-cloud verification of the cloud-side modified edge environment; and distributing the modified edge environment to the edge side.

12. The non-transitory computer readable medium of claim 11, wherein the edge data includes data for one or more MSA parameters selected from:

application programming interface (API) call data, for one or more API calls made in the edge-side, identifying an API, a start time, an end time, and a response;

micro-service CPU data identifying a micro-service, CPU usage data for the microservice, and a timestamp; and micro-service memory data identifying a microservice, memory usage data for the microservice, and a timestamp; and network bandwidth data indicating an edge side bandwidth and a timestamp.

13. The non-transitory computer readable medium of claim 12, further comprising re-sending the data collection service to collect more detailed data, wherein the more detailed data includes microservice bandwidth data identifying a microservice, a bandwidth associated with the microservice and a timestamp.

14. The non-transitory computer readable medium of claim 11, further comprising:

performing in cloud analysis to determine a variance co-matrix for one or more of the MSA parameters included in the edge data.

15. The non-transitory computer readable medium of claim 11, wherein performing the MSA measurement includes:

applying at least one of a clustering algorithm and a classification algorithm to the edge data and, in view of edge settings, determining dependencies between API calls, performance, and bandwidth one or more edge environment settings and versions.

* * * * *